United States Patent
Schwarz

[15] 3,661,627
[45] May 9, 1972

[54] HYDROPHILIC AND ANTISTATIC TREATMENT FOR POLYMERS

[72] Inventor: Eckhard C. A. Schwarz, Neenah, Wis.
[73] Assignee: Kimberly-Clark Corporation, Neenah, Wis.
[22] Filed: May 19, 1970
[21] Appl. No.: 38,875

[52] U.S. Cl. ..............................117/118, 8/115.5, 117/47 A, 117/62.1, 117/138.8 D, 117/138.8 N, 117/161 KP, 117/161 P, 260/96 R
[51] Int. Cl. .........................................................B44d 5/12
[58] Field of Search ..............117/118, 47 A, 62.1, 138.8 D, 117/138.8 N, 161 P, 161 KP; 260/96 R, DIG. 21; 8/115.5

[56] References Cited

UNITED STATES PATENTS 2,959,496  11/1960  Baechler .................................117/118
3,382,090  5/1968  Meisel ....................................117/47 A

*Primary Examiner*—Alfred L. Leavitt
*Assistant Examiner*—Janyce A. Bell
*Attorney*—Daniel J. Hanlon, Jr., William D. Herrick and Raymond J. Miller

[57] ABSTRACT

A surface modification to impart antistatic and hydrophilic properties to polyurethanes or polyamides by reaction with acrylonitrile and a base.

5 Claims, No Drawings

HYDROPHILIC AND ANTISTATIC TREATMENT FOR POLYMERS

DESCRIPTION OF THE INVENTION

This invention relates generally to the treatment of hydrophobic polymers to render them hydrophilic and antistatic at the surface. More particularly the invention pertains to the use of a bath containing acrylonitrile and a base such as sodium hydroxide or triethylamine to react with the surface of hydrophobic polymers imparting hydrophilic and antistatic properties thereto.

Polymers such as polyamides, e.g. nylon, and polyurethanes which have acidic hydrogens have wide utility as fibers, films or foams. However, such products are generally hydrophobic and require treatment to render them antistatic. Thus, for applications such as sponges or wipes where liquid pickup is important or wrapping film where printability is a factor or where the buildup of static charge is a problem, one or more treatment steps or coatings is generally necessary to provide a useful product. Examples of such processes may be found in U. S. Pat. Nos. 2,900,278; 3,149,000; 3,249,465; and 3,382,090.

It is a primary object of the present invention to provide a singe treatment that will alter the surface properties of such polymers so that they become both hydrophilic and have good antistatic qualities.

Other objects and advantages of the invention will become apparent upon reading the following detailed description and upon reference to the specific examples.

While the invention will be described in connection with one or more preferred embodiments, it will be understood that I do not intend to limit the invention to those embodiments. On the contrary, I intend to cover all alternatives, modifications, and equivalents as may be included within the spirit and scope of the invention as defined by the appended claims.

EXAMPLE I

Example I illustrates the effect of the present invention on polyurethanes. A 5.0 gram film sample of polyurethane which had been prepared from toluene diisocyanate and polypropylene oxide was stirred for 3 hours at 90° C in an aqueous bath of 100 ml containing 0.5 gram of sodium hydroxides Acrylonitrile was added, 5 grams at the start and 10 grams dropwise over the 3 hour period. The film was washed in distilled water, and after drying, the contact angle of water was measured at 20°. Prior to treatment the contact angle of water for this sample was 45°** When brushed with a wool cloth after treatment, the film did not accept an electrostatic charge.

EXAMPLE II

Example II demonstrates the applicability of the present invention to the treatment of polyamides. Example I was repeated with a film of polyhexamethyleneadipamide substituted for the polyurethane. After washing and drying, the contact angle of water was measured to be 25°: The polyhexamethyleneadipamide film, prior to being treated in accordance with the present invention, had a contact angle of water of 65°. This treated film also did not accept an electric charge when brushed with a wool cloth.

As the above examples illustrate, the present invention involves the preparation of an aqueous bath containing a base such as sodium hydroxide and acrylonitrile. While a preferred concentration of base is about 5 grams per liter of solution, the range of from 1 to 20 grams per liter is known to provide useful results. The preferred means for adding acrylonitrile is to start with a concentration of about 50 grams per liter adding another 100 grams per liter during the course of the reaction. However, the concentration of acrylonitrile may be varied between the limits of 20 and 200 grams per liter of solution.

While the temperature of the bath is not critical, it is preferred that it be heated to provide a reasonable rate of reaction. The preferred temperature to be used is about 90° C with the range of from 70° C to 120° C considered to be useful depending upon the desired reaction rate.

Although water is preferred as a matter of convenience as the liquid vehicle for the bath containing the acrylonitrile and base, any liquid can be used that is essentially a nonsolvent for the polymer base and nonreactive with the bath constituents. Alcohol is an additional example of such a material.

It is not intended that the invention be limited to any particular theory or concept. However, it is believed that cyanoethylation takes place. Cyanoethylation may be defined as the addition of an X-H group to the double bond of acrylonitrile, where X is carbon, oxygen, or nitrogen.

Thus it has been demonstrated that the present invention is useful for all hydrophobic polymers having an acidic hydrogen. When treated in accordance with this invention, such polymers may be printed and otherwise used as films requiring an antistatic behavior. Further, the polyurethanes of the present invention may be foamed in a conventional manner as illustrated, for example, by the aforementioned patents, and used alone or in combination with other materials as wipes or sponges.

The invention is not limited to sodium hydroxide as a base component. In fact, any base known to effect cyanoethylation may be used. Examples of other such bases include triethylamine, potassium hydroxide, and N-dialkyl aniline.

While the invention has been described with reference to specific examples, it is not to be restricted thereto. In its broadest aspects, the invention may be variously embodied within the scope of the appended claims.

I claim:

1. Method of treating polymers characterized by an acidic hydrogen to render them more hydrophilic and antistatic comprising the step of contacting said polymer with a composition containing 20 to 200 grams per liter of solution of acrylonitrile and 1 to 20 grams per liter of solution of a base capable of effecting cyanoethylation, said composition further containing a liquid vehicle which is essentially a nonsolvent for the polymer and nonreactive with said acrylonitrile and base.

2. The method of claim 1 wherein the polymer is selected from the group consisting of polyurethanes and polyamides.

3. The method of claim 1 wherein said composition is prepared by adding about 5 grams of the base per liter of solution to the liquid vehicle, adding about 50 grams of acrylonitrile per liter of solution, and adding another 100 grams of acrylonitrile per liter of solution during the course of the reaction.

4. The method of claim 1 wherein the base is selected from the group consisting of sodium hydroxide, triethylamine, potassium hydroxide, and N-dialkyl aniline.

5. The method of claim 1 wherein the composition comprises an aqueous bath at an elevated temperature of from 70° C to 120° C.

* * * * *